United States Patent
Marshall et al.

(10) Patent No.: US 6,757,409 B2
(45) Date of Patent: Jun. 29, 2004

(54) METHOD FOR GENERATING A UNIQUE AND CONSISTENT SIGNAL PATTERN FOR IDENTIFICATION OF AN INDIVIDUAL

(75) Inventors: John Marshall, Farnborough Hants (GB); David Usher, Whetstone (GB)

(73) Assignee: Retinal Technologies, Inc., Boston, MA (US)

( * ) Notice: Subject to any disclaimer, the term of this patent is extended or adjusted under 35 U.S.C. 154(b) by 0 days.

(21) Appl. No.: 10/103,106

(22) Filed: Mar. 21, 2002

(65) Prior Publication Data

US 2002/0097895 A1 Jul. 25, 2002

Related U.S. Application Data (63) Continuation of application No. 09/705,133, filed on Nov. 2, 2000, now Pat. No. 6,453,057.

(51) Int. Cl.$^7$ ................................................ G06K 9/00
(52) U.S. Cl. ...................................... 382/117; 382/128
(58) Field of Search ........................ 382/115–119, 128; 902/3–6; 235/380, 382, 382.5; 713/182, 186; 340/5.1, 5.42, 5.52, 5.8, 5.81, 5.82

(56) References Cited

U.S. PATENT DOCUMENTS

| | | | |
|---|---|---|---|
| 4,109,237 A | 8/1978 | Hill | |
| 4,393,366 A | 7/1983 | Hill | |
| 4,620,318 A | 10/1986 | Hill | |
| 4,641,349 A | 2/1987 | Flom et al. | |
| D302,153 S | 7/1989 | Karecki | |
| 4,975,969 A | 12/1990 | Tal | |
| 4,993,068 A | 2/1991 | Piosenka et al. | |
| 5,291,560 A | 3/1994 | Daugman | |
| 5,359,669 A | 10/1994 | Shanley et al. | |
| 5,412,738 A | 5/1995 | Brunelli et al. | |
| 5,457,747 A | 10/1995 | Drexler et al. | |
| 5,532,771 A | 7/1996 | Johnson et al. | |
| 5,572,596 A | 11/1996 | Wildes et al. | |
| 5,581,630 A | 12/1996 | Bonneau, Jr. | |
| 5,615,277 A | 3/1997 | Hoffman | |
| 5,673,097 A | 9/1997 | Heacock | |
| 5,751,836 A | 5/1998 | Wildes et al. | |
| 5,845,733 A | 12/1998 | Wolfsen | |
| 5,861,938 A | 1/1999 | Heacock | |
| 5,861,939 A | 1/1999 | Heacock | |
| 5,901,238 A | 5/1999 | Matsushita | |
| 5,956,122 A | 9/1999 | Doster | |
| 5,978,494 A | 11/1999 | Zhang | |
| 5,995,014 A | 11/1999 | DiMaria | |
| 6,453,057 B1 * | 9/2002 | Marshall et al. | 382/117 |

* cited by examiner

*Primary Examiner*—Vikkram Bali
(74) *Attorney, Agent, or Firm*—McAndrews, Held & Malloy, Ltd.

(57) ABSTRACT

The method of the present invention includes the analysis of data representing a bit mapped image of an area of an individual's retina that includes the optic disk where the data for each pixel of the image represents the intensity of the pixel. The method of the present invention locates the optic disk in the image and generates a unique and consistent signal pattern for identifying an individual from pixel data having a predetermined relationship to the individual's optic disk. The generated signal pattern is then used to verify the identity of the individual.

11 Claims, 8 Drawing Sheets

METHOD FOR GENERATING A UNIQUE AND CONSISTENT SIGNAL PATTERN FOR IDENTIFICATION OF AN INDIVIDUAL

CROSS-REFERENCE TO RELATED APPLICATIONS

This application is a continuation of U.S. patent application Ser. No. 09/705,133 filed Nov. 2, 2000, now U.S. Pat. No. 6,453,057. This application is also related to U.S. patent application Ser. No. 09/174,980 filed Nov. 2, 2000 and entitled "System For Capturing An Image Of The Retina For Identification."

TECHNICAL FIELD

The present invention is directed to a method of processing data representing an image of an individual's retina to identify the individual and more particularly to such a system that generates a unique and consistent signal pattern for identification of an individual from data representing the individual's optic disk.

STATEMENT REGARDING FEDERALLY SPONSORED RESEARCH OR DEVELOPMENT

N/A

BACKGROUND OF THE INVENTION

Various devices are known that detect a vascular pattern in a portion of an individual's retina to identify the individual. Examples of such devices are disclosed in U.S. Pat. Nos. 4,109,237; 4,393,366; and 4,620,318. In these devices, a collimated beam of light is focused on a small spot of the retina and the beam is scanned in a circular pattern to generate an analog signal representing the vascular structure of the eye intersecting the circular path of the scanned beam. In the U.S. Pat. No. 4,393,366, the circular pattern is outside of the optic disk or optic nerve and in the U.S. Pat. No. 4,620,318, the light is scanned in a circle centered on the fovea. These systems use the vascular structure outside of the optic disk because it was thought that only this area of the retina contained sufficient information to distinguish one individual from another. However, these systems have problems in consistently generating a consistent signal pattern for the same individual. For example, the tilt of the eye can change the retinal structure "seen" by these systems such that two distinct points on the retina can appear to be superimposed. As such, the signal representing the vascular structure of an individual will vary depending upon the tilt of the eye. This problem is further exacerbated because these systems analyze data representing only that vascular structure which intersects the circular path of scanned light, if the individual's eye is not in exactly the same alignment with the system each time it is used, the scanned light can intersect different vascular structures, resulting in a substantially different signal pattern for the same individual.

BRIEF SUMMARY OF THE INVENTION

In accordance with the present invention, the disadvantages of prior retinal identification systems and methods have been overcome. Unlike the prior art, the method of the present invention includes the analysis of bit mapped image data representing the intensity of pixels forming an image of an area of an individual's retina that includes the optic disk. The method of the present invention locates the optic disk in the image and generates a unique and consistent signal pattern for identifying an individual from pixel data having a predetermined relationship to the individual's optic disk. The generated signal pattern is then used to verify the identity of the individual.

More particularly, the method of the present invention finds, from the pixel data, the boundary of the optic disk in the image and generates a signal pattern from the intensity data representing pixels having a predetermined relationship with respect to the boundary of the optic disk. The signal pattern generated from the data representing the image of the optic disk is then compared to one or more stored signal patterns to verify the identity of the individual.

In accordance with one embodiment of the present invention, the boundary of the optic disk is found by fitting a circle onto the image of the optic disk represented by the pixel data and distorting the circle to fit an ellipse onto the image of the optic disk. A circle fitting closest to the image of the individual's optic disk is found by analyzing the average intensity of the pixels within the circle and the average edge strength of the pixels positioned about the circumference of the circle as the circle's parameters are changed to fit it onto the optic disk. The closest fitting circle is distorted into an ellipse based on the change in the average edge strength of the pixels positioned about the circumference of the ellipse as the ellipse parameters are changed.

In one embodiment of the present invention, the signal pattern identifying the individual is generated from a series of values, each value representing the average intensity of the pixels in an edge or boundary area at successive positions along the path of the ellipse fit onto the optic disk image. The average intensity of pixels associated with the optic disk and having a different relationship with respect to the boundary of the optic disk can also be used to generate a unique and repeatable signal pattern to identify an individual. For example, the area of the optic disk within the boundary can be divided into a number of sectors in which the average intensity of pixels within each sector can be used to form the signal pattern identifying an individual. Alternatively, the average intensity of the pixels at different points taken along one or more predetermined paths within the optic disk boundary or adjacent to the boundary but outside thereof can be used to form the signal pattern identifying the individual.

The method of the present invention has been found to generate a unique and consistent signal pattern to identify an individual. The method has also been found to successfully match the signal patterns generated from images of different quality to the signal pattern stored for an individual so as to provide a more reliable and robust retinal identification method than has heretofore been possible. These and other advantages and novel features of the present invention, as well as details of an illustrated embodiment thereof, will be more fully understood from the following description and drawings.

DETAILED DESCRIPTION OF THE INVENTION

Figure 1:
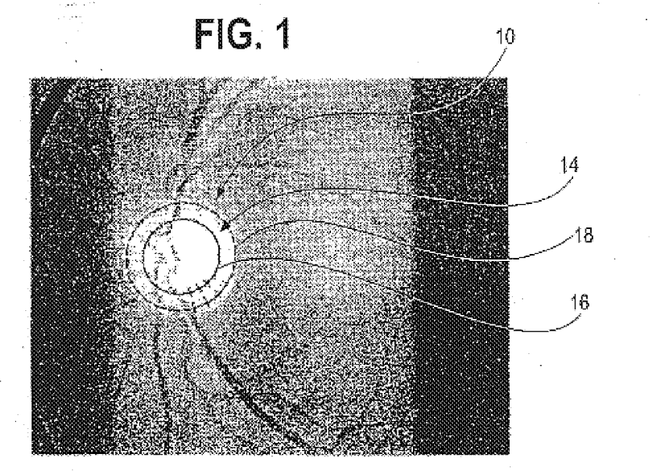
FIG. 1 is an illustration of a retinal image obtained from a Fundus Camera and an elliptical boundary area of the optic disk identified by the method of the present invention from the image's pixel data.
Figure 2:
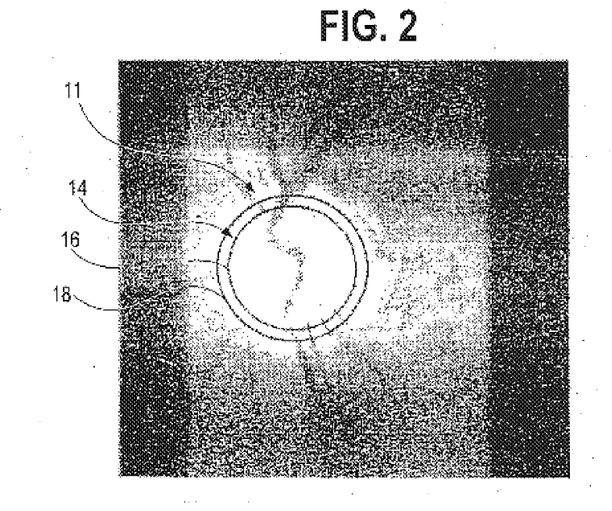
FIG. 2 is an illustration of a retinal image obtained from a Scanning Laser Ophthalmoscope and an elliptical boundary area of the optic disk identified by the method of the present invention from the image's pixel data.
Figure 3:
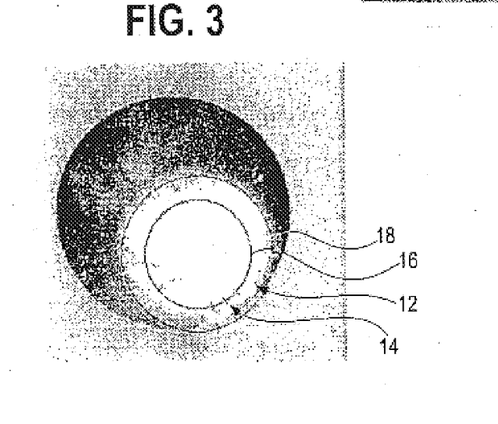
FIG. 3 is an illustration of an image of a retina obtained from another system and an elliptical boundary area of the optic disk identified by the method of the present invention.
Figure 10:
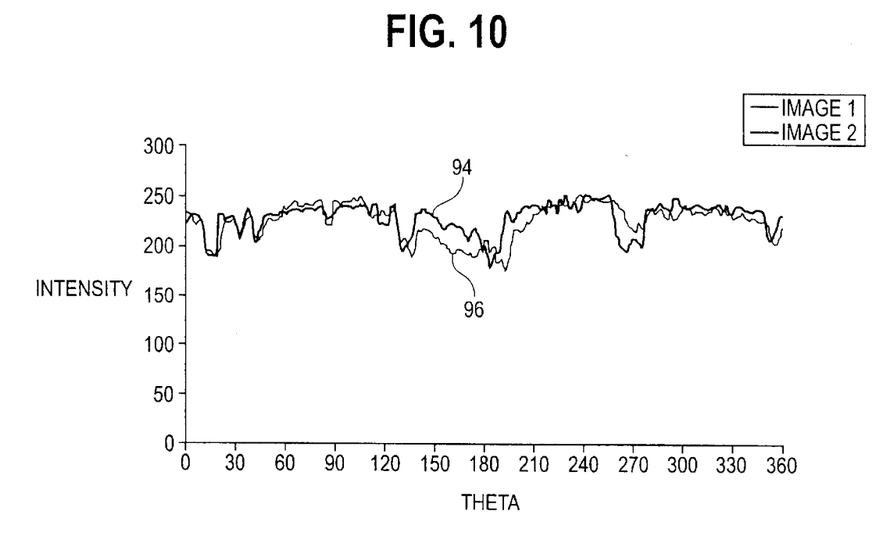
FIG. 10 is an illustration of two signal patterns generated for the same individual from two different images of the individual's retina taken several months apart.
Figure 11:
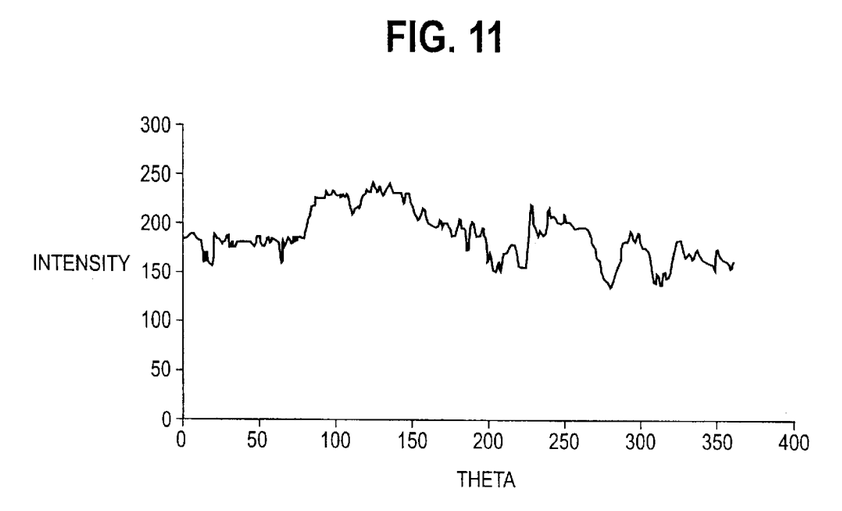
FIG. 11 is a signal pattern generated from the retinal image of FIG. 3 for another individual.

The method of the present invention analyzes bit mapped image data representing the intensity of pixels forming an image of an area of an individual's retina that includes the optic disk. As used herein, bit mapped image data is such that a particular group of data bits corresponds to and represents a pixel at a particular location in the image. FIGS. 1–3 illustrate various retinal images obtained from a number of different sources where the received image was digitized and analyzed in accordance with the present invention. As can be seen from each of these images, the respective optic disk 10, 11 and 12 of FIGS. 1, 2 and 3 appears on the image as the brightest or highest intensity area. A boundary area 14 of each optic disk 10, 11, 12 found in accordance with the present invention is identified by the area between two concentric ellipses 16 and 18. The ellipse 18 is an ellipse that was fit onto the respective optic disk 10, 11, 12 in accordance with the present invention and the ellipse 16 has a predetermined relationship to the ellipse 18 as discussed in detail below. A unique signal pattern is generated for an individual, in accordance with one embodiment of the invention, from the average intensity of the pixels within the boundary area 14 at various angular positions along the elliptical path fit onto the image of the optic disk. Examples of signal patterns generated in accordance with the method of this embodiment are depicted in FIGS. 10 and 11 as discussed in detail below. It has been found that the optic disk contains the smallest amount of information in the eye to uniquely identify an individual. Because the eye pivots about the optic nerve, an image of the optic disk is the most stable and repeatable image that can be obtained. As such, the pixel data representing the image of the optic disk is used in accordance with the present invention to generate a unique and consistent signal pattern to identify an individual.

Figure 4:
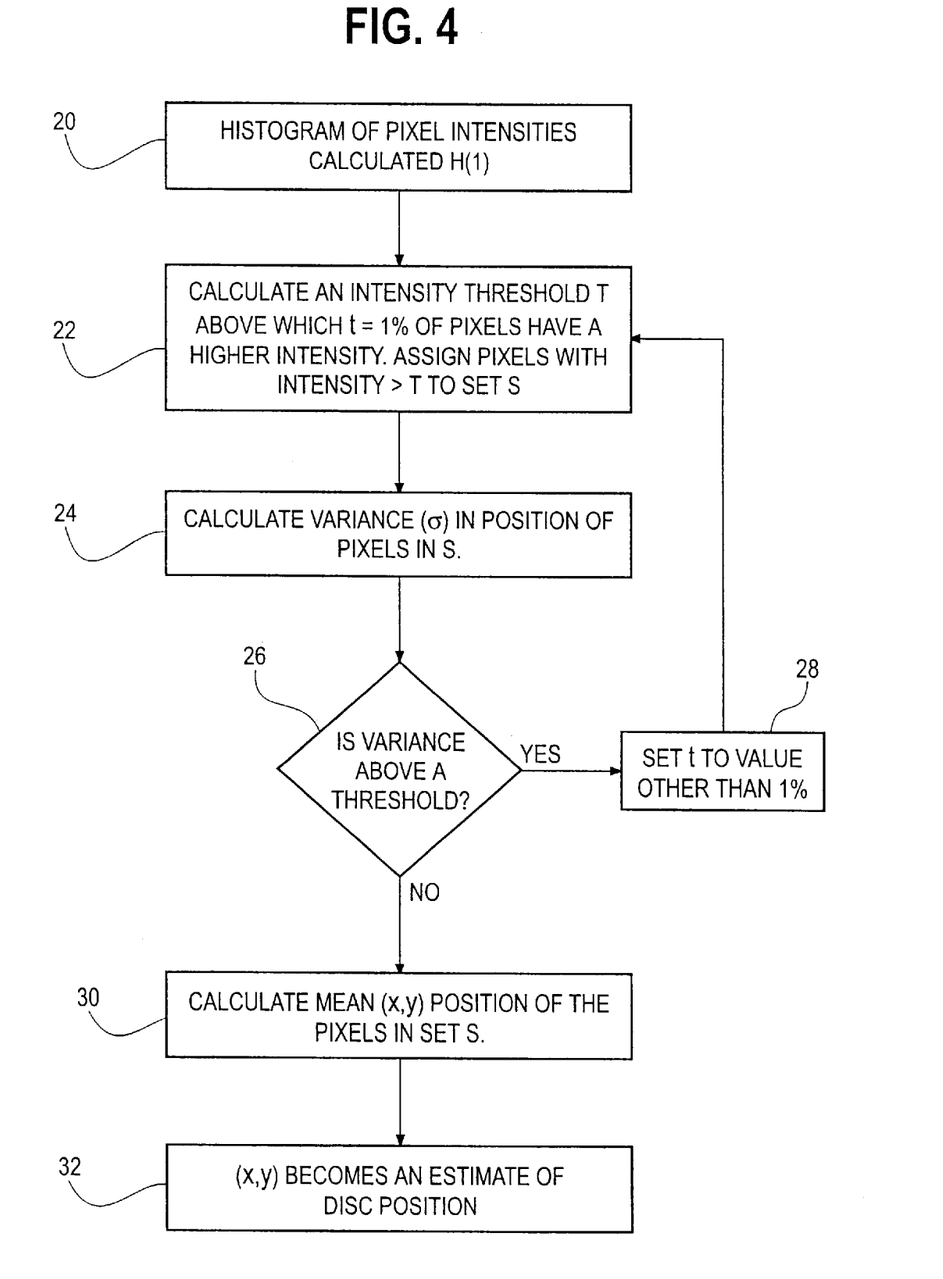
FIG. 4 is an illustration of a method for locating the optic disk on the image.

The method of the present invention analyzes received pixel intensity data representing an image of an individual's retina by first finding the location of the optic disk in the image represented by the data. The location of the optic disk in the image of the retina will vary depending upon the system used to obtain the image. FIG. 4 illustrates one embodiment of a method for finding the location of the optic disk in an image of the retina. In accordance with this method, an estimated location of the center of the optic disk in the image, as represented by the pixel data, is obtained by identifying the mean or average position of a concentrated group of pixels having the highest intensity. It is noted that the method of the present invention as depicted in FIGS. 4–7 and 9 can be implemented by a computer or processor.

More particularly, as shown at block 20, a histogram of the pixel intensities is first calculated by the processor for a received retinal image. Thereafter, at block 22, the processor calculates an intensity threshold where the threshold is set to a value so that 1% of the pixels in the received image have a higher intensity than the threshold, T. At block 22, the processor assigns those pixels having an intensity greater than the threshold T to a set S. Thereafter, at block 24, the processor calculates, for the pixels assigned to the set S, the variance in the pixel's position or location within the image as represented by the pixel data. The variance calculated at block 24 indicates whether the highest intensity pixels as identified at block 22 are concentrated in a group as would be the case for a good retinal image. If the highest intensity pixels are spread throughout the image, then the image may contain unwanted reflections. At block 26, the processor determines if the variance calculated at block 24 is above a threshold value and if so, the processor proceeds to block 28 to repeat the steps beginning at block 22 for a different threshold value. For example, the new threshold value T might be set so that 0.5% of the pixels have a higher intensity than the threshold or so that 1.5% of the pixels have a higher intensity than the threshold. It is noted that instead of calculating a threshold T at step 22, the threshold can be set to a predetermined value based on typical pixel intensity data for a retinal image. If the variance calculated at block 24 is not above the variance threshold as determined at block 26, the processor proceeds to block 30 to calculate the x and y image coordinates associated with the mean or average position of the pixels assigned to the set S. At block 32, the x, y coordinates determined at block 30 become an estimate of the position of the center of the optic disk in the image.

Figure 5:
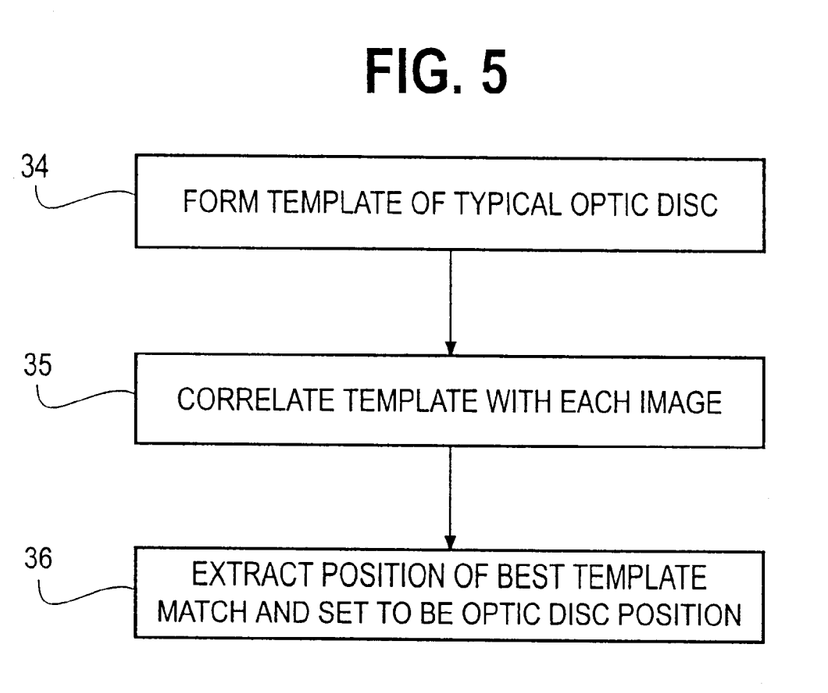
FIG. 5 is a flow chart illustrating an alternative method for locating the optic disk on the image.

An alternative method of finding the optic disk could utilize a cluster algorithm to classify pixels within the set S into different distributions. One distribution would then be identified as a best match to the position of the optic disk on the image. A further alternative method for finding the optic disk is illustrated in FIG. 5. In accordance with this method, a template of a typical optic disk is formed as depicted at block 34. Possible disk templates include a bright disk, a bright disk with a dark vertical bar and a bright disk with a dark background. The disk size for each of these templates is set to a size of a typical optic disk. At block 35, the template is correlated with the image represented by the received data and at block 36, the position of the best template match is extracted. The position of the optic disk in the image is then set equal to the position of the best template match It should be apparent, that various other signal processing techniques can be used to identify the position of the optic disk in the image as well.

Figure 6:
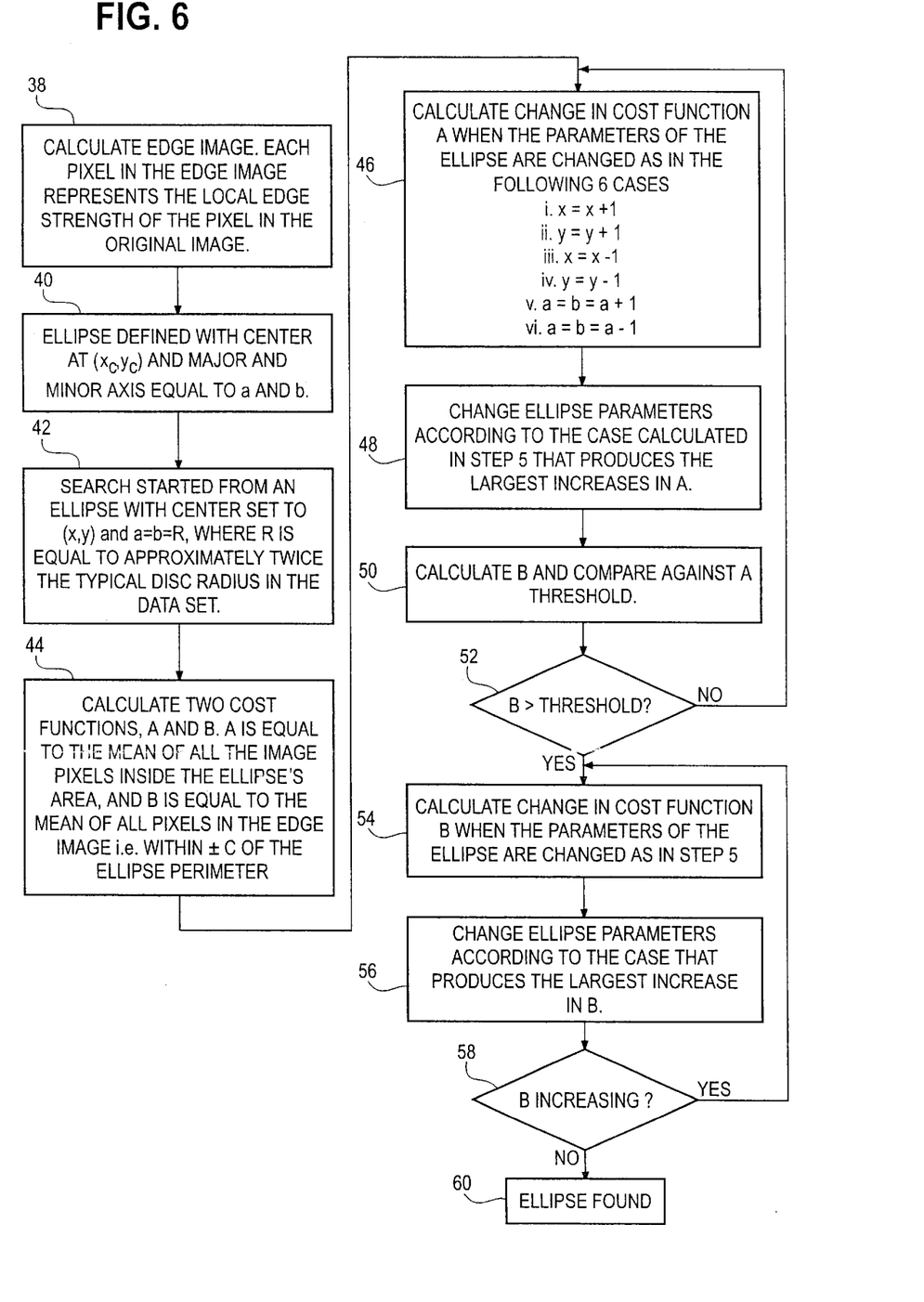
FIG. 6 is a flow chart illustrating a method for finding the closest fitting circle to the optic disk.
Figure 7:
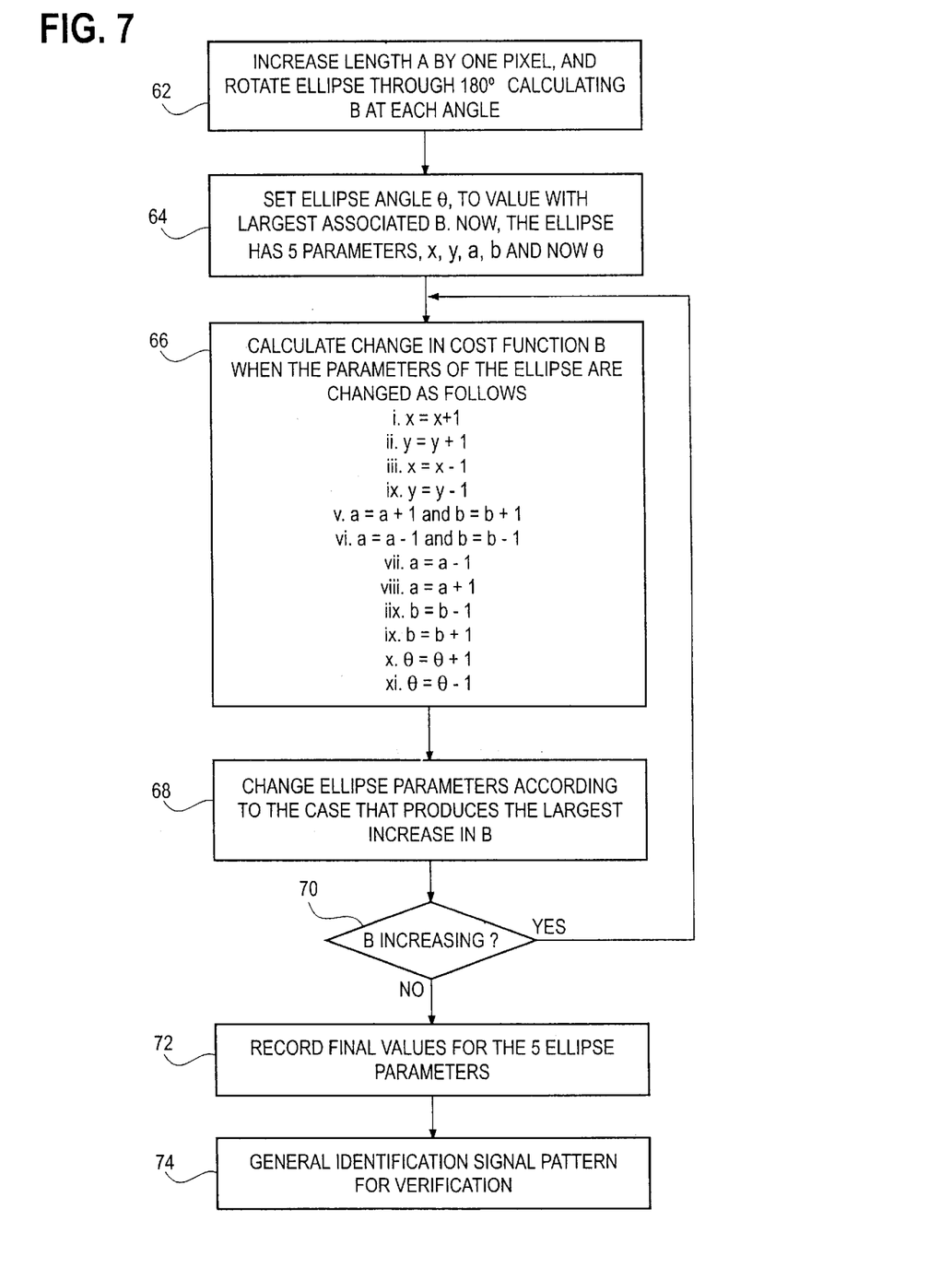
FIG. 7 is a flow chart illustrating a method for distorting the closest fitting circle into an ellipse that more closely matches the shape of the optic disk on the image.

In accordance with the present invention, after locating the optic disk, the boundary of the disk is found by determining a contour approximating a shape of the optic disk. The shape of a typical optic disk is generally an ellipse. Since a circle is a special type of ellipse in which the length of the major axis is equal to the length of the minor axis, the method first finds the closest fitting circle to the optic disk as shown in FIG. 6. The method then distorts the closest fitting circle into an ellipse, as depicted in FIG. 7, to find a better match for the shape of the optical disk in the received image.

The algorithm depicted in FIG. 6 fits a circle onto the image of the optic disk based on an average intensity of the pixels within the circle and the average edge strength of the pixels about the circumference of the circle, i.e. within the boundary area 14, as the circle is being fit. More particularly, as shown at block 38, the processor first calculates an edge strength for each of the pixels forming the image. Each pixel in the retinal image has an associated edge strength or edge response value that is based on the difference in the intensities of the pixel and its adjacent pixels. The edge strength for each pixel is calculated using standard, known image processing techniques. These edge strength values form an edge image.

At block 40, an ellipse is defined having a center located at the coordinates $x_c$ and $y_c$ within the bit mapped image and a major axis length set equal to a and a minor axis length set equal to b. At block 42, the search for the closest fitting circle starts by setting the center of the ellipse defined at block 40 equal to the estimated location of the center of the optic disk determined at block 32 of FIG. 4. At block 42, the major axis a and the minor axis b are set equal to the same value R to define a circle with radius R, where R is two times a typical optic disk radius. It is noted that other values for the starting radius of the circle may be used as well. At block 44, a pair of cost functions, A and B are calculated. The cost function A is equal to the mean or average intensity of the pixels within the area of an ellipse, in this case the circle defined by the parameters set at block 42. The cost function B is equal to the mean or average edge strength of the pixels within a predetermined distance of the perimeter of an ellipse, again, in this case the circle defined at block 42.

At block 46, the processor calculates the change in the cost function A for each of the following six cases of parameter changes for the ellipse circle: (1) x=x+1; (2) y=y+1; (3) x=x 1; (4) y=y−1; (5) a=b=a+1; (6) a=b=a−1. At block 48, the processor changes the parameter of the circle according to the case that produced the largest increase in the cost function A as determined at block 46. For example, if the greatest increase in the cost function A was calculated for a circle in which the radius was decreased by 1, then at block 48, the radius is set to a=b=a−1 and the coordinates of the center remain the same. At block 50, a new value is calculated for the cost function B for the circle defined at block 48. At block 52, the processor determines whether the cost function value B calculated at block 50 exceeds a threshold. If not, the processor proceeds back to block 46 to calculate the change in the cost function A when each of the parameters of the circle defined at block 48 are changed in accordance with the six cases discussed above.

When the cost function B calculated for a set of circle parameters exceeds the threshold as determined at block 52, this indicates that part of the circle has found an edge of the optic disk and the algorithm proceeds to block 54. At block 54, the processor calculates the change in the cost function B when the parameters of the circle are changed for each of the cases depicted in step 5 at block 46. At block 56, the processor changes the ellipse pattern according to the case that produced the largest increase in the cost function B as calculated at step 54. At block 58, the processor determines whether the cost function B is increasing and if so, the processor returns to block 54. When the cost function B, which is the average edge strength of the pixels within the boundary area 14 of the circle being fit onto the optic disk, no longer increases, then the processor determines at block 60 that the closest fitting circle has been found.

Figure 8:
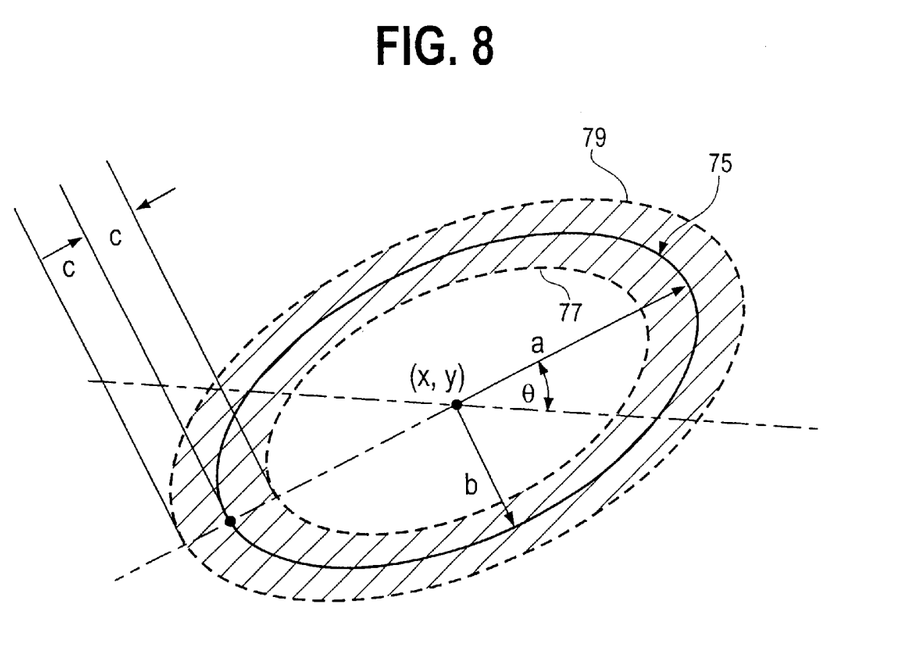
FIG. 8 is an illustration of an ellipse and the 5 parameters defining the ellipse as well as the boundary or edge area about the periphery of the ellipse used to generate a unique signal pattern in accordance with one method of the invention.

After finding the closest fitting circle, the method of the invention distorts the circle into an ellipse more closely matching the shape of the optic disk in accordance with the flow chart depicted in FIG. 7. At block 62 of FIG. 7, the length of the major axis a is increased by one pixel. This ellipse is then rotated through 180° from a horizontal axis and the cost function B is calculated for the ellipse at each angle. At block 64, the processor sets the angle θ of the ellipse, as shown in FIG. 8, to the angle associated with the largest cost function B determined at block 62. FIG. 8 illustrates the five parameters defining the ellipse: x, y, a, b and θ. Also shown in FIG. 8 is the edge area or boundary area 14 for which the cost function B is calculated wherein the area 14 is within ±c of the perimeter of the ellipse. A typical value for parameter c is 5, although other values may be used as well.

At block 66, the processor calculates the change in the cost function B when the parameters of the ellipse are changed as follows:

(1) X=x+1
(2) y=y+1
(3) x=x−1
(4) y=y−1
(5) a=a+1 and b=b+1
(6) a=a−1 and b=b−1
(7) a=a−1
(8) a=a+1
(10) b=b+1
(11) θ=θ+1
(12) θ=θ−1

At block 68, the processor changes the ellipse parameter that produces the largest increase in the cost function B as determined at block 66 to fit the ellipse onto the optic disk image. Steps 66 and 68 are repeated until it is determined at block 70 that the cost function B is no longer increasing. At this point the processor proceeds to block 72 to store the final values for the five parameters defining the ellipse fit onto the image of the optic disk as represented by the pixel data. The ellipse parameters determine the location of the pixel data in the bit mapped image representing the elliptical boundary 18 of the optic disk in the image as illustrated in FIGS. 1, 2 and 3 and the elliptical optic disk boundary 75 shown in FIG. 9. The processor proceeds from block 72 to block 74 to generate a signal pattern to identify the individual from pixel data having a predetermined relationship to the boundary 18, 75 of the optic disk found at block 72. This step is described in detail for one embodiment of the present invention with respect to FIGS. 8 and 9.

Figure 9:
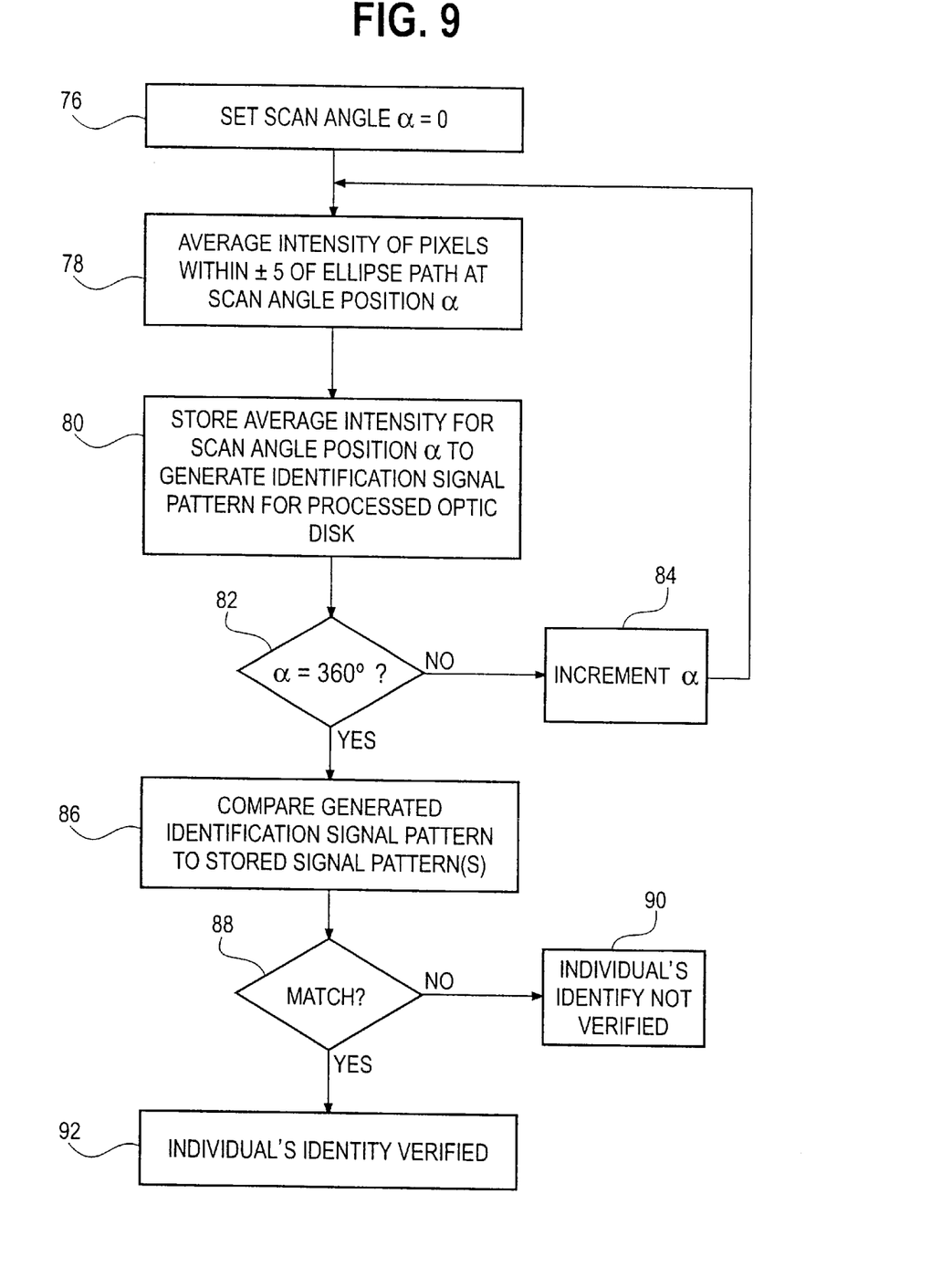
FIG. 9 is a flow chart illustrating one embodiment of the method for generating a signal pattern from the pixel data at a number of positions determined with respect to the boundary area of the optic disk.

The method depicted in FIG. 9 generates the signal pattern identifying the individual from the pixel intensity data within a boundary area 14 defined by a pair of ellipses 77 and 79 which have a predetermined relationship to the determined optic disk boundary 75 as shown in FIG. 8. Specifically, each of the ellipses 77 and 79 is concentric with the optic disk boundary 75 and the ellipse boundary 77 is −c pixels from the optic disk boundary 75; whereas the ellipse boundary 79 is +c pixels from the optic disk boundary 75. In accordance with the method of generating the signal pattern as shown in FIG. 9, the processor at block 76 sets a scan angle α to 0. At block 78, the processor calculates the average intensity of the pixels within ±c of the ellipse path defined at block 72 for the scan angle α. As an example c is shown at block 78 to be set to 5 pixels. At block 80, the processor stores the average intensity calculated at block 78 for the scan angle position α to form a portion of the signal pattern that will identify the individual whose optic disk image was analyzed. At block 82, the processor determines whether the angle α has been scanned through 360°, and if not, proceeds to block 84 to increment α. The processor then returns to block 78 to determine the average intensity of the pixels within ±c of the ellipse path for this next scan angle α. When α=360°, the series of average pixel intensities calculated and stored for each scan angle position from 0 through 360° form a signal pattern used to identify the processed optic disk image. This generated signal pattern is then compared at block 86 to a signal pattern stored for the individual, or to a number of signal patterns stored for different individuals, to determine if there is a match. If a match is determined at block 88, the individual's identity is verified at block 92. If the generated signal pattern does not match a stored signal pattern associated with a particular individual, the identity of the individual whose optic disk image was processed is not verified as indicated at block 90.

In another embodiment of the present invention, as illustrated in FIGS. 1–3, the boundary area 14, from which the signal pattern identifying the individual is generated, is defined by the optic disk boundary 18 determined at block 72 and a concentric ellipse 16 having major and minor axes that are a given percentage of the length of the respective major and minor axes a and b of the ellipse 18. For example, as shown in FIGS. 1 and 3, the length of the major and minor axes of the ellipse 16 are 70% of the length of the respective major and minor axes of the ellipse 18. In FIG. 2, the length of the major and minor axes of the ellipse 16 are 90% of the length of the respective major and minor axes of the ellipse 18. It should be appreciated that other percentages can be used as well including percentages greater than 100% as well as percentages that are less than 100%. Once the boundary area 14 is defined, the signal pattern can be generated by calculating the average intensity of the pixels within the boundary area 14 at various scan angle position α as discussed above.

FIG. 10 illustrates the signal patterns 94 and 96 generated from two different images of the same individual's retina where the images were taken several months apart. As can be seen from the two signals 94 and 96, the signal pattern generated from the two different images closely match. Thus, the method of the present invention provides a unique signal pattern for an individual from pixel intensity data representing an image of a portion of the optic disk where a matching or consistent signal pattern generated from different images of the same individual's retina. Consistent signal patterns are generated for images having different quality levels so that the present invention provides a robust method for verifying the identity of an individual. FIG. 11 illustrates a signal pattern generated for a different individual from the image of FIG. 3.

The signal pattern generated in accordance with the embodiments discussed above represents the intensity of pixels within a predetermined distance of the optic disk boundary 75. It should be appreciated, however, that a signal pattern can be generated having other predetermined relationships with respect to the boundary of the optic disk as well. For example, in another embodiment of the invention, the signal pattern is generated from the average intensity of pixels taken along or with respect to one or more predetermined paths within the optic disk boundary or outside of the optic disk boundary. It is noted that these paths do not have to be elliptical, closed loops or concentric with the determined optic disk boundary. The paths should, however, have a predetermined relationship with the optic disk boundary to produce consistent signal patterns from different retinal images captured for the same individual. In another embodiment, the area within the optic disk boundary is divided into a number of sectors and the average intensity of the pixels within each of the sectors is used to form a signal pattern to identify an individual. These are just a few examples of different methods of generating a signal pattern having a predetermined relationship with respect to the boundary of the optic disk found in accordance with the flow charts depicted in FIGS. 6 and 7.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method of processing bit mapped image data representing the intensity of each of a plurality of pixels forming an image of an area of an individual's retina including the optic disk to generate a signal pattern to verify the identity of the individual, comprising:

finding a boundary of the optic disk in the image represented by said pixel data wherein finding the optic disk boundary includes fitting an ellipse onto the optic disk image represented by the pixel data and wherein fitting the ellipse onto the optic disk includes calculating a function representing the average intensity of the pixels within an ellipse;

generating a signal pattern representing the intensity of pixels having a predetermined relationship with respect to the boundary of the optic disk; and comparing the generated signal pattern to a stored signal pattern to verify the identity of the individual.

2. A method of processing bit mapped image data representing the intensity of each of a plurality of pixels forming an image of an area of an individual's retina including the optic disk to generate a signal pattern to verify the identity of the individual, comprising:

finding a boundary of the optic disk in the image represented by said pixel data wherein finding the optic disk boundary includes fitting an ellipse onto the optic disk image represented by the pixel data and wherein fitting the ellipse onto the optic disk includes calculating a function representing an average edge strength for pixels in an edge area of the ellipse;

generating a signal pattern representing the intensity of pixels having a predetermined relationship with respect to the boundary of the optic disk; and comparing the generated signal pattern to a stored signal pattern to verify the identity of the individual.

3. A method of processing bit mapped image date representing the intensity of each of a plurality of pixels forming an image of an area of an individual's retina including the optic disk to generate a signal pattern to verify the identity of the individual comprising:

finding a boundary of the optic disk in the image represented by said pixel data;

generating a signal pattern representing the intensity of pixels having a predetermined relationship with respect to the boundary of the optic disk including
        calculating the average intensity of pixels within a predetermined distance of the boundary for each of a plurality of positions along the boundary; and
        forming the signal pattern from the calculated average intensities; and comparing the generated signal pattern to a stored signal pattern to verify the identity of the individual.

4. A method of processing bit mapped image date representing the intensity of each of a plurality of pixels forming an image of an area of an individual's retina including the optic disk to generate a signal pattern to verify the identity of the individual comprising:
- finding a boundary of the optic disk in the image represented by said pixel data;
- generating a signal pattern representing the intensity of pixels having a predetermined relationship with respect to the boundary of the optic disk including
  - defining at least one path within the boundary of the optic disk;
  - calculating the average intensity of pixels about the path for each of a plurality of positions along the path; and
  - forming at least a portion of the signal pattern from the calculated average intensities; and
- comparing the generated signal pattern to a stored signal pattern to verify the identity of the individual.

5. A method of processing bit mapped image date representing the intensity of each of a plurality of pixels forming an image of an area of an individual's retina including the optic disk to generate a signal pattern to verify the identity of the individual comprising:
- finding a boundary of the optic disk in the image represented by said pixel data;
- generating a signal pattern representing the intensity of pixels having a predetermined relationship with respect to the boundary of the optic disk including
  - defining at least one path outside of the boundary of the optic disk, the path having a predetermined relation to the boundary;
  - calculating the average intensity of pixels about the path for each of a plurality of positions along the path; and
  - forming at least a portion of the signal pattern from the calculated average intensities; and
- comparing the generated signal pattern to a stored signal pattern to verify the identity of the individual.

6. A method of processing data representing an image of a retina including the optic disk as recited in claim 5 Wherein said path is an elliptical path concentric with said boundary.

7. A method of processing data representing an image of a retina including the optic disk as recited in claim 5 wherein said path is adjacent to the boundary.

8. A method of processing bit mapped image date representing the intensity of each of a plurality of pixels forming an image of an area of an individual's retina including the optic disk to generate a signal pattern to verify the identity of the individual comprising:
- finding a boundary of the optic disk in the image represented by said pixel data;
- generating a signal pattern representing the intensity of pixels having a predetermined relationship with respect to the boundary of the optic disk including
  - defining a plurality of sectors within the boundary;
  - calculating the average intensity of the pixels within each of the sectors;
  - forming the signal pattern from the calculated average intensities; and
- comparing the generated signal pattern to a stored signal pattern to verify the identity of the individual.

9. A method of processing bit mapped image data representing the intensity of each of a plurality of pixels forming an image of an area of an individual's retina including the optic disk to generate a signal pattern to verify the identity of the individual comprising:
- estimating a center of the optic disk from a location of a group of the highest intensity pixels in the image;
- finding a boundary of the optic disk in the image represented by said pixel data;
- generating a signal pattern representing the intensity of pixels having a predetermined relationship with respect to the boundary of the optic disk; and
- comparing the generated signal pattern to a stored signal pattern to verify the identity of the individual.

10. A method of processing bit mapped image data representing the intensity of each of a plurality of pixels forming an image of an area of an individual's retina including the optic disk to generate a signal pattern to verify the identity of the individual comprising:
- finding a boundary of the optic disk in the image represented by said pixel data including determining the location of the pixels in the bit mapped image representing an elliptical boundary of the optic disk;
- generating a signal pattern representing the intensity of pixels having a predetermined relationship with respect to the boundary of the optic disk; and
- comparing the generated signal pattern to a stored signal pattern to verify the identity of the individual.

11. A method of processing bit mapped image data representing the intensity of each of a plurality of pixels forming an image of an area of an individual's retina including the optic disk to generate a signal pattern to verify the identity of the individual, comprising:
- determining a location of the optic disk in the image from said pixel data wherein the location of the optic disk is determined by estimating a center of the optic disk from a group of the highest intensity pixels in the image;
- fitting a contour approximating a shape of at least a portion of the optic disk onto the image of the optic disk represented by the pixel data; and
- generating a signal pattern representing an average intensity of the pixels at a plurality of positions determined with respect to said contour.

* * * * *